US007463339B2

United States Patent
(12) United States Patent
Hinderling et al.

(10) Patent No.: US 7,463,339 B2
(45) Date of Patent: Dec. 9, 2008

(54) DEVICE FOR MEASURING THE DISTANCE TO FAR-OFF OBJECTS AND CLOSE OBJECTS

(75) Inventors: Juerg Hinderling, Marbach (CH); Paul Benz, Diepoldsau (CH); Marcel Buerki, Au (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 10/583,544

(22) PCT Filed: Dec. 16, 2004

(86) PCT No.: PCT/EP2004/014362

§ 371 (c)(1), (2), (4) Date: Jun. 1, 2007

(87) PCT Pub. No.: WO2005/064359

PCT Pub. Date: Jul. 14, 2005

(65) Prior Publication Data

US 2007/0242258 A1 Oct. 18, 2007

(30) Foreign Application Priority Data

Dec. 19, 2003 (CH) .................................. 02193/03

(51) Int. Cl.
*G01C 3/08* (2006.01)

(52) U.S. Cl. .................... 356/5.01; 356/5.02; 356/5.03; 356/5.1

(58) Field of Classification Search ....... 356/3.01–3.15, 356/4.01–4.1, 5.01–5.15, 6–22
See application file for complete search history.

(56) References Cited

U.S. PATENT DOCUMENTS 5,116,124 A * 5/1992 Huttmann .................. 356/342
2001/0050764 A1* 12/2001 Shirai ......................... 356/5.1
2002/0044270 A1* 4/2002 Shirai et al. ................ 356/4.01

FOREIGN PATENT DOCUMENTS

| | | |
|---|---|---|
| DE | 43 16 348 A1 | 11/1994 |
| DE | 198 40 049 A1 | 4/2000 |
| DE | 101 28 484 A1 | 3/2002 |
| EP | 0 448 111 A2 | 9/1991 |
| EP | 0 635 729 A1 | 1/1995 |
| EP | 0 768 542 A1 | 4/1997 |
| WO | WO 01/29576 A | 4/2001 |
| WO | WO 03/002939 A1 | 1/2003 |

* cited by examiner

*Primary Examiner*—Thomas H Tarcza
*Assistant Examiner*—Luke D Ratcliffe
(74) *Attorney, Agent, or Firm*—Rothwell, Figg, Ernst & Manbeck P.C.

(57) ABSTRACT

A device for measuring the distances (d) to far-off objects (8) and close objects by emitting modulated laser beams (1) that are reflected on the objects. The device includes an objective (2), structure(s) (12, 36, 38, 39, 40) for selecting beams, and a receiver (7). Beams are bundled by the objective, the beams not only containing the laser beams (3) reflected on the objects but also background beams (28). The beams in an associated cross-sectional region (34, 37) of the bundle are selected from a bundle of beams by the selection structure(s) (12, 36, 38, 39, 40). The cross-sectional region includes a first section (5) and at least one second section (6), laser beams (3) reflected by a far-off object being associated with the first section (5), and laser beams (3) reflected by a close object (8) being associated with the at least second section (6).

19 Claims, 3 Drawing Sheets

DEVICE FOR MEASURING THE DISTANCE TO FAR-OFF OBJECTS AND CLOSE OBJECTS

CROSS-REFERENCE TO RELATED APPLICATION

This application is a National Phase of International Application Ser. No. PCT/EP2004/014362, filed 16 Dec. 2004.

BACKGROUND OF THE INVENTION

1. FIELD OF THE INVENTION

The invention relates to a device for measuring the distance to close and far-off objects by which laser beams modulated and emitted by the device are reflected, according to the preamble of claims 1 and 4.

2. Description of the Background Art

Such devices for measuring the distance to an object with an accuracy within a few millimeters have long been known and are now used in large numbers for a very wide range of applications, in particular in surveying and construction. For measuring the distance, a transmitted bundle of optical rays are projected by such a device toward the object to be measured. At least some of the rays of the transmitted bundle are reflected by the object. Rays which comprise rays reflected by the object and interfering background rays are collected by means of an optical system of the device and are converted by a receiver of the device into a single electrical signal which comprises a useful signal which can be coordinated with the respective rays or background noise. On the basis of the propagation velocity of optical rays, the distance to the object can be determined by evaluating the electrical signal.

Depending on the respective application and the required distance range, measurement is effected to different types of objects.

On the one hand, measurements of the distance in a range from a few centimeters to a few hundred meters can be carried out to an object which reflects the transmitted rays unoriented and scattered back to the device. Such an object typically has a naturally rough surface. The distance is determined by that region of the surface which the transmitted bundle strikes. The size of the illuminated region thus determines the local resolution of the measurement on the surface of the object which reflects with scattering. In the case of many objects, a high local resolution is a pre-condition for an accurate measurement. The smaller the divergence of the transmitted bundle, the smaller is the illuminated region and—according to DE 198 40 049 A1—the higher in general is the fundamentally achievable accuracy of the measurement of the distance to an object which reflects with scattering.

On the other hand, distance measurements in a wide range from a few centimeters to several kilometers can be carried out to an object which reflects the emitted rays oriented back to the device. An object which reflects in an oriented manner is in practice often in the form of a corner cube prism of ground glass. Since such an object has retroreflectivity which is several orders of magnitude greater than an object which reflects with scattering, only the object reflecting with orientation can be selectively measured by the device. Automatic target seeking devices of many surveying instruments are now also based on this property. It is known that the greater the divergence of the transmitted bundle, the less exactly need a device for distance measurement be aligned with such an object. Without exact alignment of the device, it is possible—according to DE 198 40 049 A1—considerably to increase the convenience of the distance measurement to an object which reflects with orientation, in particular in the case of short and medium distances.

In such devices, two different basic forms of the arrangement of the transmitted bundle relative to the received bundle are known. In the monoaxial basic form, a common objective is provided for the received bundle and the transmitted bundle. Today, the transmitted bundle is as a rule arranged inside the received bundle with the aid of a central reflecting element. For this purpose, the central reflecting element is as a rule arranged on the optical axis of the common objective. In the biaxial basic form, on the other hand, the received bundle and the transmitted bundle are arranged a distance apart. In each case a separate objective is provided for the transmitted bundle and the received bundle.

Compared with the respective other basic form, the two basic forms have advantages and disadvantages which are of different importance depending on use.

Independently of the basic form, however, a problem with the detection of the transmitted rays reflected by the object occurs in the case of such devices on measurement to an object unless special measures are taken, since—independently of the basic form—from a certain distance the reflected transmitted rays to be converted by the receiver become fewer the closer the object is to the device. If the useful signal coordinated with the reflected transmitted rays falls below a critical strength, the accuracy or the rapidity of the measurement is impaired or a measurement even becomes completely impossible.

In the case of a device of monoaxial basic form, a problem with detection may occur owing to shadowing due to the central reflecting element during measurement to a close object. The reflecting element blocks the path to the receiver for at least a part of the reflected transmitted rays collected by the objective. The closer the object to be measured is to the device, the greater the extent to which the collected transmitted rays migrate in the focal plane of the objective away from the centre toward the periphery and, depending on the formation of the receiver, may be lost with regard to conversion into an electrical signal. Both during measurements to a close corner cube prism which reflects in an oriented manner and with whose corner the transmitted bundle is centrally aligned and during measurements to a close object which reflects with scattering, the useful signal can fall below a critical value. Various measures are known for avoiding failure to reach said critical values.

DE 101 28 484 A1 discloses a distance-measuring device which has a common objective, a transmitted bundle in the form of a collimated laser beam and a received bundle arranged coaxially thereto. A measure for overcoming the shadowing problem provides three optical waveguides which are arranged side by side and whose entry areas of different sizes are arranged side by side in the focal plane of the object. The largest entry area is coordinated with measurements to far-off objects. The received bundles transmitted by the optical waveguides are focused via a collecting lens onto a detector. The received bundle is expanded by the three entry areas so that even distances to close and far-off objects can be measured. An alternative measure provides a single optical waveguide having an entry area of the same dimensions. Since in general the circumference of interfering rays of the background is also proportional to the entry area of the optical waveguide, an optical screening mask is arranged in front in order to improve the ratio of reflected transmitted rays and interfering rays with the background. The mask has a central diaphragm and at least one lateral diaphragm whose diameter is small in comparison with the central diaphragm.

DE 696 08 066 T2 discloses a distance-measuring device which has a common objective, a transmitted bundle in the form of a collimated laser beam and a received bundle arranged coaxially therewith. For measuring short distances to objects which reflect with scattering, a deflecting device is provided which deflects measured light which is reflected with scattering and has migrated from the optical axis of the objective back toward the axis. The provision of such deflecting devices gives rise to corresponding costs in the production of such devices.

In the case of a device of biaxial basic form, problems occur with detection in the case of measurements to a close object, owing to a parallax of the transmitted and received bundles which are a distance apart. The closer the object to be measured is to the device, the greater the extent to which the received bundle migrates in the focal plane away from the optical axis of the transmitted bundle a distance away. Both in the case of measurements to a close corner cube prism which reflects in an oriented manner and with whose corner the transmitted bundle is centrally aligned and in the case of measurements to a close object which reflects with scattering, the useful signal may fall below a critical value. The prior art discloses a multiplicity of very different measures to prevent said signal from falling below said critical value.

WO 03/002 939 A1 discloses a device for optical distance measurement of biaxial basic form comprising a transmitted bundle in the form of a collimated laser beam and an optical detector whose photosensitive area is extended in the shape of a drop or wedge, so that it is adequate for a beam shift of transmitted rays reflected by a target object even in the case of decreasing distances to the target object. The area tapers in the direction of the beam shift of decreasing target object distances.

DE 43 16 348 A1 discloses a device for distance measurement of biaxial basic form comprising an optical fiber which can be moved in the focal plane and which tracks the received bundle of the device as a function of the distance to the object to be measured. This measure firstly reduces the speed of the measurement and secondly requires a complicated design.

DE 692 25 811 T2 discloses an optical radar device for vehicles, whose transmitting device also provides a decollimated transmitted bundle of laser beams by means of a semiconductor laser diode and a multi-focal optical system and thus illuminates a carriageway section for optical distance determination to obstacles. With such a device, short to medium distances can be determined accurately to a decimeter.

SUMMARY OF THE INVENTION

It is an object of the invention to eliminate deficiencies of the prior art and to provide a simple device for distance measurement, by means of which it is possible to measure accurately in a convenient manner to oriented objects or to objects which reflect with scattering and which are present in a wide range from close to the device to far from the device.

The object is achieved by a device having the features disclosed herein.

In the measurement of distances to far off and close objects, laser beams modulated by a device according to the invention are emitted and are reflected by the objects. The device has an objective, means for selecting rays and a receiver. The objective collects rays which also comprise background rays next to laser beams reflected by the objects. The means select from a bundle of collected rays those rays which belong to a cohesive cross-sectional region of the bundle. The cross-sectional region has a first and at least one second section, laser beams reflected by a far off object being coordinated with a first section and laser beams reflected by a close object being coordinated with the at least second section, and only a fraction of the collected laser beams reflected by the close object being selected via the second section. Selected rays of the bundle are converted via the receiver into a single electrical signal by means of which the distance can be determined with the aid of the propagation velocity of optical rays. According to the invention, the means are formed in such a way that the at least one second section has at least dimensions of the first section. Consequently, the bundle of selected rays can be formed outside the device in such a way that firstly sufficient reflected transmitted rays are converted for convenient measurement to the close object and secondly—particularly in the case of measurement to far-off objects—the background noise is reduced, with the result that the measuring range of the device can be extended.

A further object of the invention is to provide an above-mentioned device which has a steady curve of the useful signal with small differences in the strength of the useful signal over of the distance measuring range. This can be achieved with increasing intensity of the collected laser beams reflected by the increasingly close object and taken into account in the formation of the tapering—starting from the second to the first section.

In addition, the device for distance measurement is to be further developed so that the device can be integrated in a telescope of a theodolite.

Further alternatives or advantageous developments or further developments of the invention are described in the features disclosed herein.

BRIEF DESCRIPTION OF THE DRAWINGS

The invention is explained in more detail below purely by way of example with reference to the figures. Identical articles in different working examples which perform the same functions are provided below with the same designations and reference numerals.

DETAILED DESCRIPTION OF THE INVENTION

Figure 1:
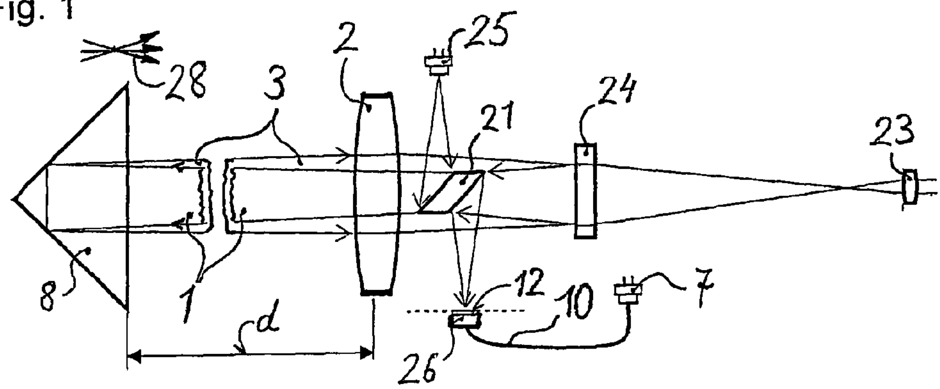
FIG. 1 shows a schematic measuring arrangement comprising an object which reflects with orientation and a device according to the invention of monoaxial basic form integrated coaxially in a telescope, in side view.

FIG. 1 shows a measuring arrangement comprising an object which reflects with scattering and a distance-measuring device according to the invention of monoaxial basic form which is integrated coaxially in a schematically shown telescope, for example of a theodolite.

Figure 2:
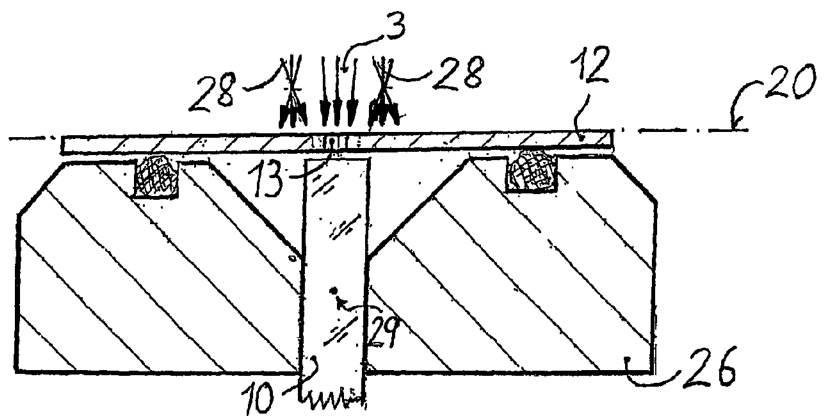
FIG. 2 shows a larger-scale detailed view of first means for selecting rays of the device from FIG. 1 and a bundle of projected rays, in side view.
Figure 3:
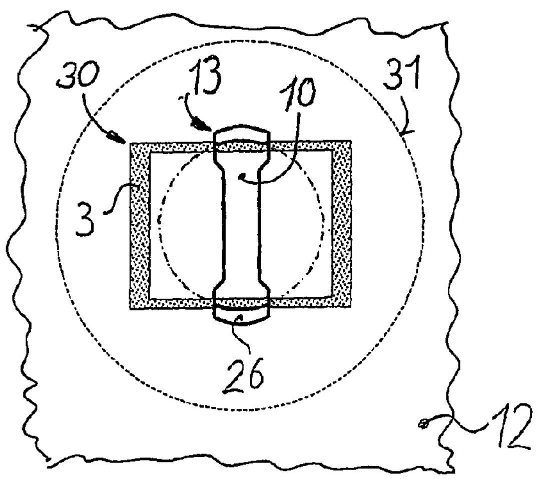
FIG. 3 shows a larger-scale detailed view of the first means from FIG. 2 in plan view.

The object which reflects with orientation is formed here as a corner cube prism 8 and is present at a variable distance d from the device. The object may be a short distance of, for example, 1 meter to a long distance of, for example, 1 kilometer from the device. Purely exemplary, schematic diagrams of rays in FIGS. 1, 2 and 3 are based on a short distance d of about one meter. Here, the device for measurement is integrated in the telescope in such a way that a bundle of laser beams 1 modulated by the device and transmitted to the corner cube prism 8 is coaxial with the sighting line of the device.

In this measuring arrangement, the corner cube prism 8 is measured in coincidence. The sighting line of the device is aligned with the reflection center of the corner cube prism 8 which is formed by a corner thereof. Here, the emitted laser beams 1 are reflected in a manner known per se by the corner cube prism 8 with point symmetry relative to the axis of the bundle. The divergence of the bundle from reflected laser beams 3 corresponds to the divergence of the bundle from emitted laser beams 1.

Here, the telescope with integrated device for measuring the distance has a laser diode 25, a central reflecting element 21 of rectangular cross-section, an objective 2, a wavelength-selective mirror 24, a diaphragm 12, a centering mount 26, a cylindrical multimode optical fiber 10, a receiver 7 and an eyepiece 23.

Here, the emission area of the laser diode 25 for generating modulated laser beams is arranged substantially before the focal plane of the objective 2 on the transmitter side, with the result that the emitted laser beams 1 are projected in the form of a decollimated bundle with a substantial divergence onto the corner cube prism 8. The individual part-bundles of the decollimated bundle have different divergence angles which are substantially proportional to the relative angle of the propagation direction of the respective part-bundle with the axis of the decollimated bundle. The divergence of the part-bundle increases steadily starting from the axis of the decollimated bundle, where the propagation of light is substantially parallel to the axis, transversely to the axis. Here, it has a divergence of about five millirad at the edge of the bundle of emitted laser beams 1. At least a part of the emitted laser beams 1 is reflected by the corner cube prism 8.

Rays which comprise at least a part of the laser beams 3 reflected by the corner cube prism 8 and background rays 28 are collected by the objective 2. In the case of the distance d of one meter, envisaged in FIGS. 1, 2 and 3, the total decollimated bundle of emitted laser beams 1 is reflected back by the corner cube prism 8 and the total decollimated bundle of reflected laser beams 3 is collected. Here, not all collected rays can pass through the central reflecting element 21 owing to the arrangement thereof.

The fraction of emitted rays which are reflected by an object and can pass through a central reflecting element is determined substantially by the manner in which the object reflects, by the divergence of emitted rays and not least by the distance from the object to the device.

The reflected laser beams 3 which have passed through the reflecting element 21 are reflected back by the wavelength-selective mirror 24, deflected by the back of the central reflecting element 21 and projected onto the diaphragm 12. At least a part of the projected rays is transmitted via the optical fiber 10 to the receiver 7 and converted there into an electrical signal, on the basis of which the distance sought is then determined in a manner known per se. Problems can also occur in measurements to objects at very close distances d in the case of devices corresponding to FIG. 1 and having a decollimated bundle of emitted laser beams 1 if reflected laser beams 3 cannot reach the receiver 7 to an extent sufficient for fast and reliable measurement.

FIG. 2 shows a larger-scale detailed view of first means for selecting rays of the device from FIG. 1 and a schematic bundle of rays projected thereon, in side view. Here, the first means for selecting rays have an end piece of the optical fiber 10 and the diaphragm 12. The diaphragm 12 is kept just above the entry area of the optical fiber 10 in the focal plane 20 on the receiver side by the centering mount 26. The bundle of rays projected on to the diaphragm 12 contains laser beams 3 reflected by the corner cube prism 8 from FIG. 1 and background rays 28, which are collected, reflected and deflected. The reflected laser beams 3 are present in the form of a decollimated bundle having a common collecting point 29 which is behind the focal plane 20 on the receiver side, in this case in the end piece of the optical fiber 10. The diaphragm 12 has an elongated diaphragm opening 13 whose opening cross-sectional area is visible in FIG. 3.

FIG. 3 shows a larger-scale detailed view of the first means from FIG. 2 with parts of the diaphragm 12, of the optical fiber 10 and of the centering mount 26 together with a schematic image of the bundle of projected rays in plan view. The bundle of projected rays which is shown in FIG. 2 comprises reflected rays 3 and background rays 28 which—as shown in FIG. 1—were collected by the objective 2 and deflected by the back of the central reflecting element 21. Here, the diaphragm opening 13 of the diaphragm 12 is arranged concentrically with the entry area of the optical fiber 10 and has a cohesive, elongated cross-sectional area whose two end sections have in each case broader parts on both sides. Here, a part of the centering mount 26 and a part of the entry area of the cylindrical optical fiber 10 are visible through the diaphragm opening 13. The edge of the entry area, which is not visible here, is represented by a dot-dash line.

A part of the bundle of projected rays is blocked at the diaphragm 12. The other part of the bundle can pass through via the cohesive, elongated diaphragm opening 13 of the diaphragm 12. A substantial part strikes the entry area of the optical fiber 10. In this way, the rays from a certain region of the cross-section of the bundle are selected from the bundle of projected rays.

Since—as shown in FIG. 1—the major part of the collected laser beams 3 reflected by the close corner cube prism 8 cannot pass through the central reflecting element 21 which has a rectangular shape in this working example, the reflected laser beams 3 which pass through form a narrow, rectangular frame 30, which is shown here schematically by means of a multiplicity of dots. Here, the shape of the frame 30 is determined in particular by the shape of the central reflecting element 21, by the distance to the corner cube prism 8 and by the extent of the decollimation of the bundle. Since emitted laser beams 1 are reflected back by the corner cube prism 8 with orientation, the frame 30 is relatively sharply delimited.

Collected background rays 28 from FIGS. 1 and 2 are present inside a region, whose boundary is shown in FIG. 3 by the dashed circular line 31. The shape and extent of this region is determined here inter alia by the objective 2. As shown in FIG. 2, in addition to the laser beams 3 reflected by the corner cube prism 8, background rays 28 can also be selected and then transmitted by means of the diaphragm 12 and the entry area of the optical fiber 10.

Figure 4:
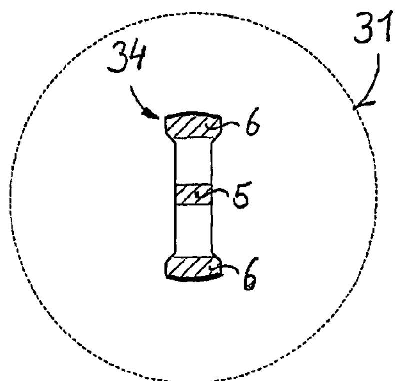
FIG. 4 shows a cross-section through the projected bundle of rays.

FIG. 4 shows a cross-section through the bundle of rays which are projected onto the diaphragm 12, which cross-section is present in the focal plane 20 from FIG. 2. The dashed circular line 31 bounds the cross-section of the bundle. As shown in FIG. 3, rays of a cohesive first cross-sectional region 34 are selected from the bundle of projected rays by the diaphragm 12 and the optical fiber 10 via the diaphragm opening 13 and the entry area, respectively. Here, the first cross-sectional region 34 with the selected rays corresponds to the common sectional area of the cross-sectional area of the diaphragm orifice 13 and the entry area of the optical fiber 10.

Here, the cohesive first cross-sectional region 34 has a first section 5 in the middle and a second section 6 at each of the two ends. The two second sections 6 have—corresponding to the broader parts of the diaphragm opening 13 from FIG. 3—a larger dimension than the first section 5. Nevertheless, only a fraction of the collected laser beams reflected by the close object is selected via the second sections.

As shown in FIGS. 1 and 3, the selected rays 3 reflected by a close corner cube prism 8 are each present within one of the two second sections 6. The selected rays, which also contain background rays 28 in addition to reflected laser beams 3, are transmitted via the optical fiber 10 to the receiver 7. Here, the selected rays are converted by the receiver 7 into an electrical signal which, in addition to an actually desired useful signal which can be coordinated with rays 3 reflected by the corner cube prism 8, has interfering background noise which can be coordinated with the background rays 28. The smaller the ratio of the useful signal to the background noise—the so-called signal-to-noise ratio SNR—the smaller in general is the maximum distance d which can be measured by the device.

Figure 5:
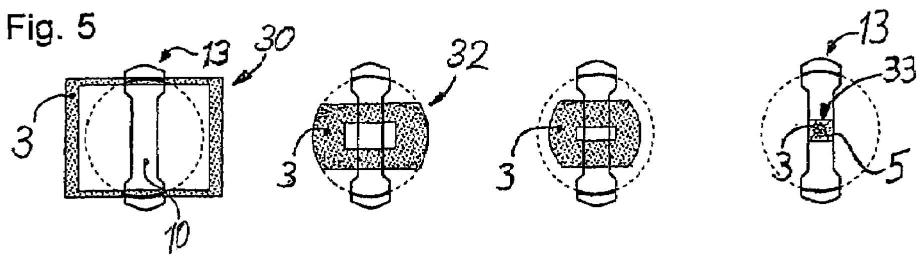
FIG. 5 shows a comparison of four plan views—corresponding to FIG. 3—which are based on different distances to the object which reflects with orientation.

FIG. 5 shows a comparison of four different plan views corresponding to FIG. 3, the distance d of the corner cube prism 8 from FIG. 1 having a value of about one, five, twenty or greater than one hundred meters, depending on the plan view.

All four plan views show the only partly visible entry area of the optical fiber 10 and the diaphragm opening 13 which is in the focal plane 20, from FIG. 2, which is on the receiver side. Each plan view shows collected rays projected onto the diaphragm 12 from FIG. 3 with reflected laser beams 3 present in the form of a decollimated bundle. Since, in FIG. 1, emitted laser beams 1 are reflected with orientation by the corner cube prism 8, the projected images of the reflected laser beams 3 are relatively sharply delimited here.

The first plan view—identical to that in FIG. 3—is based on the close distance d of about one meter from FIG. 1. The reflected laser beams 3 form the narrow rectangular frame 30 from FIG. 3. The two vertical and horizontal frame parts have only a width in the region of a few hundredths of a millimeter. The relatively large extension of the entry area of the cylindrical optical fiber 10 having a diameter of typically from one fourth to a whole millimeter makes it possible here, together with the elongated extension of the diaphragm opening 13, for even reflected laser beams 3 which are far away from the centre—of measurements to close corner cube prisms—to reach the receiver. Since in addition the two horizontal frame parts of reflected laser beams 3 come to be located here in the broader parts of the diaphragm opening 13, reflected laser beams 3 which could pass through the central reflecting elements can additionally enter the entry area and be selected in this manner. As a result, short distances d can also be reliably and rapidly measured.

The second plan view is based on a medium distance d of about five meters. The reflected laser beams 3 form a semicircular frame 32 having substantially broader frame parts since the rectangular recess in the center accounts for only a fraction of the frame area. The vertical frame parts are rounded on their outside since the total decollimated bundle of emitted laser beams is no longer reflected back with orientation by the corner cube prism from a distance d of about five meters. Although the broad horizontal frame parts come to be located here in a section without a broader part, they can gain sufficient reflected laser beams 3 to be able to carry out the measurements reliably and rapidly.

The larger the chosen distance d to the corner cube prism 8 from FIG. 1, the smaller is the projected image with the rectangular recess of the decollimated bundle of reflected laser beams 3.

The fourth plan view is based on a long distance d greater than one hundred meters. Here, the cross-section of the decollimated bundle of collected and reflected laser beams 3 forms, in the focal plane 20 from FIG. 1, which is on the receiver side, a circular area 33 which, as before, has in the centre a rectangular recess no longer visible in FIG. 5. The circular area 33—with laser beams 3 reflected by the far-off corner cube prism 8—is entirely within the first section 5 of the cross-sectional region 34 from FIG. 4. The circular area 33 has a diameter of about one twentieth of a millimeter. Consequently, the total decollimated bundle of reflected laser beams 3 can pass through the middle section of the diaphragm opening 13—which corresponds here to the first section 5 from FIG. 4. The extension of the middle section should have at least the extension of the circular area 33.

In practice, the extension of the middle section of the diaphragm opening 13 is advantageously chosen to be about twice as large as the extension of the relevant cross-section of the decollimated bundle of laser beams 3 reflected by a far-off corner cube prism 8.

At the same time, a major part of the background rays 28 shown in FIG. 2 and projected in the direction of the entry area is blocked by the diaphragm 12 and thus can no longer enter the entry area of the optical fiber 10 through the diaphragm opening 13. As a result, the ratio of the background rays 28 to the laser beams 3 reflected by the corner cube prism can be improved since, in contrast to the background rays 28, said laser beams can all enter the entry area. This is advantageous in particular for measurements to far-off objects.

Figure 6:
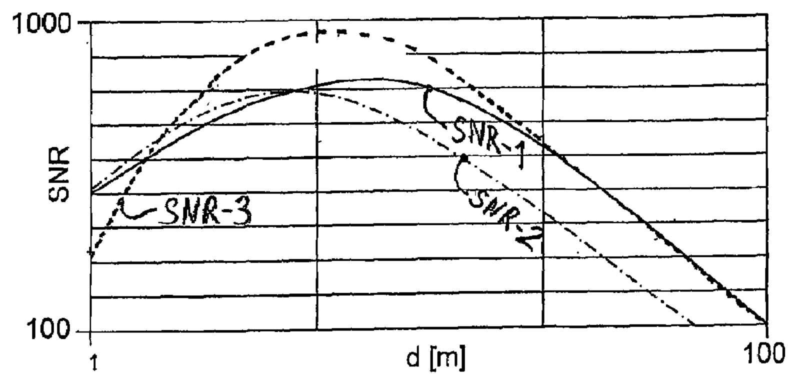
FIG. 6 shows a diagrammatic comparison of the useful signal/background noise ratio of an electrical signal of three different devices as a function of the distance.

FIG. 6 shows a purely schematic, diagrammatic comparison of three curves SNR-1, SNR-2 and SNR-3 which in each case represent the curve of the useful signal/background noise ratio SNR of three electrical signals as a function of the distance d, which electrical signals can be coordinated with three different devices. The computational determination of the respective useful signal/background noise ratio SNR is based on the measuring arrangement from FIG. 1. The distance d from the corner cube reflector 8 to the device in meters is plotted logarithmically along the abscissa of the diagrammatic comparison. The coordinated value of the useful signal/background noise ratio SNR is plotted along the ordinate.

The curve of the useful signal/background noise ratio SNR of the electrical signal generated by the receiver 7 from FIG. 1 depends to a very great extent on the respective formation and dimensioning of the parts of the device for measuring the distance. In particular, the design of the receiver and provision of means for selection can have a substantial influence on the curve.

The first curve SNR-1 shown as a solid line is coordinated with the distance-measuring device according to the invention from FIGS. 1 to 5, in which the first means—the diaphragm 12 in combination with the large-area, thick optical fiber 10—are provided for selecting rays. Since the elongated diaphragm opening 13 extends transversely over the entry area of the thick optical fiber 10, laser beams 3 reflected by the close corner cube prism 8 can also enter the optical fiber in a sufficient number. Because of the broader parts at the ends of the diaphragm opening 13, a sufficient quantity of reflected laser beams 3 can enter the optical fiber 10. A sufficiently high useful signal/background noise ratio SNR of more than one hundred permits reliable measurements also to objects at distances d substantially below one meter. Since in addition the first cross-sectional region 34 from FIG. 4 is small in comparison with the entry area of the optical fiber 10, a substantial part of the background light 28 is blocked. Particularly in the case of measurements to far-off objects, a dominant part of the background rays 28 can be blocked by the diaphragm 12, with the result that the useful signal/background noise ratio SNR during measurement to objects is substantially increased from a certain distance—in comparison with a device without means for selecting rays. Because of the means, both reliable and rapid measurement at close range and extension of the distance range for measurements to far-off objects can be effected here.

The second curve SNR-2 shown as a dot-dash line is coordinated with a modified device known per se, in which, in contrast to the device of FIGS. 1 to 5 according to the invention, no diaphragm 12 is provided which is upstream of the entry area and which has only one optical fiber which is comparable with the thick optical fiber 10 from FIG. 1. With the modified device, it is also possible reliably and conveniently to measure distances substantially below one meter to objects reflecting with orientation, with a comparable useful signal/background noise ratio SNR. In contrast, in the case of measurement to objects above a certain distance d, the useful signal/background noise ratio SNR is substantially lower owing to the absence of diaphragm 12 with the result that the maximum measurable distances d to objects are substantially reduced.

The third curve SNR-3 shown as a dashed line is coordinated with a further modified distance-measuring device which, in contrast to the modified device, has a comparatively thin, cylindrical optical fiber. The diameter of the thin optical fiber is chosen for the comparative diagram of FIG. 6 so that the entry area of the thin optical fiber corresponds approximately to the area of that part of the entry area of the thick optical fiber 10 from FIG. 3 which is not shadowed by the diaphragm 12.

Because of the smaller diameter in comparison with the above two embodiments, fewer rays reflected by the close object can enter the thin optical fiber. The third curve SNR-3 falling off steeply in the direction of short distances d makes it impossible here to carry out even reliable measurements to objects at distances substantially below one meter. Because of the rays blocked by the central reflecting element and reflected by the close object, the thinner optical fiber with its smaller extension has substantial disadvantages in measurement to close objects. In the case of measurement to far-off objects, the third curve SNR-3 on the other hand corresponds from a certain distance to the first curve SNR-1 of the device according to the invention. Consequently, measurement can be effected reliably at least to far-off objects.

A further advantage of the device according to the invention, for example having a diaphragm 12 and thick optical fiber 10, is the smaller signal variation in comparison with the two modified devices in measurement to objects at different distances from close to far-off. This applies in particular in the transition region between close and far-off objects. These small differences permit the use of simpler electro-optical devices for converting selected rays into electrical signals.

Figure 7:
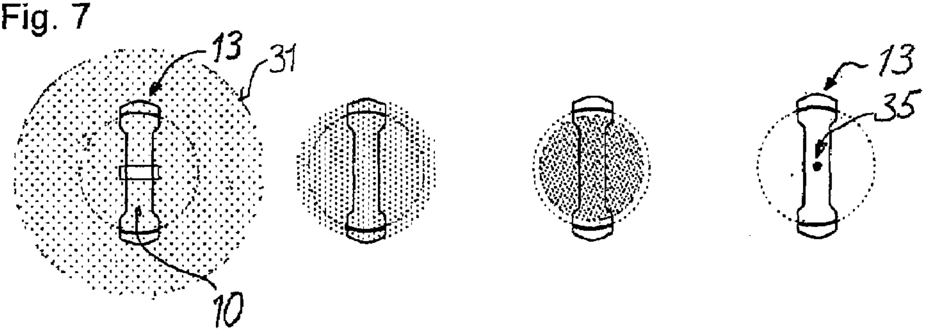
FIG. 7 shows a comparison of four plan views—corresponding to FIG. 3—with in each case different distances to an object which reflects with scattering.

FIG. 7 shows a comparison—corresponding to FIG. 5—of four different plan views, measurement being effected here with the device according to the invention not to the corner cube prism 8 from FIG. 1 but, in contrast to FIG. 5, to an object which reflects with scattering and has a naturally rough surface, which object is in each case a distance away from the device, corresponding to FIG. 5.

In the respective plan view, the collected laser beams which are reflected with scattering by the rough surface are focused on to the diaphragm 12 in the focal plane 20 from FIG. 3. Since laser beams 1 from FIG. 1 which are emitted in the form of a decollimated bundle are reflected with scattering by the rough surface, the projected images of the collected laser beams reflected with scattering are bounded in a diffuse blurred manner at their outer and inner edge.

The first plan view is based—corresponding to FIG. 5—on the short distance d of about one meter from FIG. 1. The laser beams reflected with scattering fill the region bounded by the dashed circular line 31 from FIGS. 3 and 4 for collected rays, with the exception of a rectangular recess in the center. Many of the laser beams which are reflected by the rough surface and could pass through the central reflecting element enter the entry area and are selected so that even short distances can be measured reliably and rapidly.

The greater the chosen distance to the object having the naturally rough surface the smaller is the image of reflected laser beams having a rectangular recess which is also smaller in comparison with FIG. 5.

The fourth plan view is based on a long distance d of more than one hundred meters. Here, the cross-section of reflected and collected laser beam forms, in the focal plane, on the receiver side, only a point-like area 35 which has a diameter in the region of a few micrometers and has virtually no recess in the center.

The form of the diaphragm opening 13 which is optimized here for measurement to objects which reflect with orientation makes it possible, even in the case of measurements to objects which reflect with scattering, firstly to reduce the variation of the electrical signal between close and far-off objects and secondly to effect measurement to close objects safely and reliably. As can be seen from the first plan view from FIG. 7, the shadowing which increases with decreasing distance can be partly compensated by the two broader parts of the diaphragm opening 13.

Collected background rays 28 projected in the direction of the entry area are substantially blocked here by the diaphragm 12 from FIG. 3 surrounding diaphragm opening 13 and thus can no longer enter the entry area of the optical fiber 10. Consequently, the ratio of laser beams which reflect with scattering to background rays can be increased via the diaphragm 12 even in the case of measurement to objects which reflect with scattering. This is advantageous in particular for measurements to far-off objects.

Figure 8:
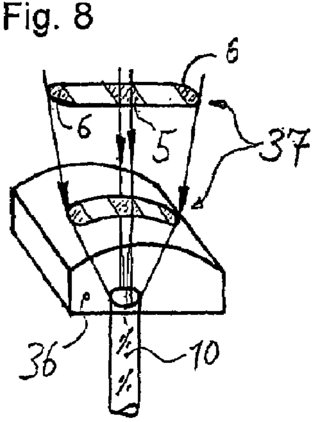
FIG. 8 shows two means for selecting rays, comprising a cylindrical lens before the entry area of an optical fiber.

FIG. 8 shows a schematic part of the bundle of projected rays from FIG. 2 and second means of a device according to the invention for selecting rays of the bundle in an oblique view. The thick optical fiber 10 from FIG. 2 and a cylindrical lens 36, which is arranged in place of the diaphragm 12 from FIG. 2 above the entry area thereof, here form the second means for selecting rays of a cohesive second cross-sectional region 37 of the cross-section of the bundle of projected rays. The second cross-sectional region 37 comprises laser beams 3 emitted by the device and reflected by an object and background rays 28 from FIG. 1 which were collected by the objective 2. The entry area of the optical fiber 10 is advantageously arranged between the cylindrical lens 36 and the focal point thereof.

A part of the bundle of projected rays which is not shown here either travels past the cylindrical lens 36 or strikes the latter but misses the entry area of the optical fiber 10. Another part of the bundle of projected rays which is shown schematically here strikes the cylindrical lens 36, is refracted by it in the direction of the entry area and can enter the optical fiber 10 and be transmitted to the receiver. By means of such a combination of a cylindrical lens 36 and the optical fiber 10 rays from a certain region of the cross-section of the bundle can be selected from the collected, projected bundle.

The cohesive second cross-sectional region 37 selected by the second means has an elongated form with a single substantially constant dimension over the longitudinal extension thereof. The two ends are each provided with a rounded part owing to the cylindrical optical fiber 10. In addition to the angles of incidence of the projected rays, the length and the dimension in the width of the cross-sectional region 37 are substantially determined by the refractive power of the cylindrical lens 36 and by the diameter of the optical fiber 10, respectively.

Here, the second cross-sectional region 37 has, in comparison with the first cross-sectional region 34 from FIG. 4—a first section 5 in the middle and a second section 6 at each of the two ends. In contrast to FIG. 4, the two second sections 6 have here the same dimension as the first section 5.

Depending on the formation of devices according to the invention, selected cross-sectional regions which also have more than two second sections may be advantageous. These may be, for example, star-shaped or arranged in the form of a four-leaved clover around the first section.

Figure 9:
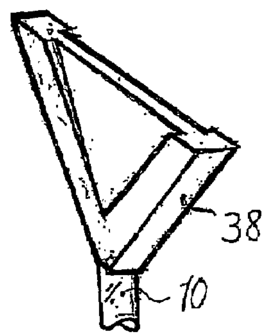
FIG. 9 shows third means for selecting rays, comprising a light-collecting funnel before the entry area of an optical fiber.

FIG. 9 shows third means for selecting rays of a device according to the invention for measuring the distance in an oblique view.

The optical fiber 10 and a funnel-like component 38 acting as a light trap and comprising glass or optically transparent plastic, which is arranged in place of the cylindrical lens 36 above the entry area thereof, here form the third means for selecting rays of a cohesive cross-sectional range of a bundle of collected rays. The entry side of the funnel-like component 38 is arranged in a device according to the invention—corresponding to the diaphragm 12 from FIG. 2—in focal plane 20 on the receiver side. The funnel-like component 38 can optionally be at least partly metallized in addition. Since the cross-sectional region selected by the funnel-like component 38 substantially corresponds to the first cross-sectional region from FIG. 4, it has an effect comparable with the diaphragm 12 from FIG. 3.

Figure 10:
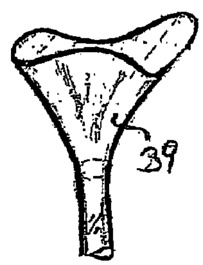
FIG. 10 shows fourth means for selecting rays, comprising a compressed end piece of an optical fiber.

FIG. 10 shows fourth means for selecting rays of a device according to the invention in an oblique view, which means are formed by an end piece 39 of an optical fiber which is squeezed together to give a funnel shape. The deformed entry area of the end piece 39 squeezed together is arranged in a device according to the invention—corresponding to the diaphragm 12 from FIG. 2—in the focal plane 20 in the receiver side. The shape of the deformed entry area and the shape of the diaphragm opening 13 or of the entry side of the funnel-like component 38 from FIG. 9 have a comparable effect.

Figure 11:
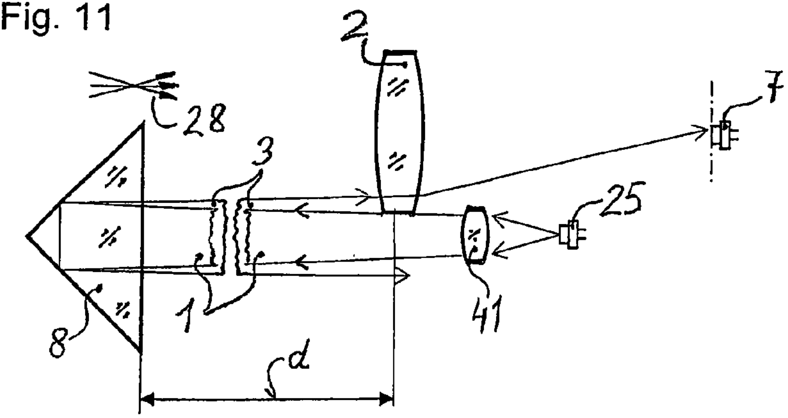
FIG. 11 shows a schematic measuring arrangement comprising an object which reflects with orientation and a biaxial device according to the invention of biaxial basic form, in side view.

FIG. 11 shows a measuring arrangement corresponding to FIG. 1 and comprising an object which reflects with orientation and a distance-measuring device according to the invention of biaxial basic form.

As in FIG. 1, measurement is effected here to an object which is in the form of a corner cube prism 8, reflects with orientation and is present at a variable distance d from the device. Here, the object is—as in FIG. 1—measured in coincidence. The device is aligned with the corner cube prism 8 in such a way that the reflection centre of the corner cube prism 8 is present on the axis of a bundle of laser beams 1 modulated and emitted by the device.

Here, the biaxial device has an objective 2 for collecting rays, a receiver 7 in the form of fifth means for selecting rays, a further objective 41 having a rectangular opening and a laser diode 25.

Here too, the emission area of the laser diode 25 for generating the modulated laser beams is arranged substantially before the focal plane of the objective 41, with the result that the emitted laser beams 1 are projected in the form of a decollimated, substantially divergent bundle—which corresponds to the decollimated bundle from FIG. 1—onto the corner cube prism 8.

Rays which comprise at least a part of the laser beams 3 reflected by the corner cube prism 8 and background rays 28 are collected by the objective 2. The laser beams 3 reflected by the corner cube prism 8 are present in the form of a decollimated bundle. The collected rays are projected in the direction of the receiver 7, which is arranged here close to the focal plane 20 of the objective 2.

As in the case of the device from FIG. 1, problems occur during measurement to objects at very close distances d—here however owing to the parallax of biaxial devices.

Figure 12:
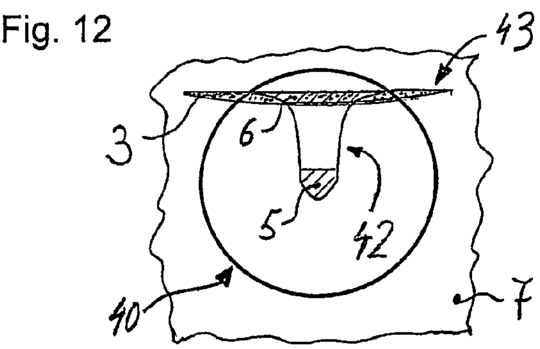
FIG. 12 shows a larger-scale detailed view of fifth means for selecting rays of the device from FIG. 11, in plan view.

FIG. 12 schematically shows a larger-scale detailed view of the fifth means for selecting rays from FIG. 11, together with an image of the bundle of collected rays reflected with orientation by a close object, in plan view. The receiver 7 has a detector 40 with an active detector area 42. Here, the cohesive detector area 42 has a trumpet-like shape which diverges progressively with elongation.

Since—as shown in FIG. 11—the major part of laser beams 3 reflected by the close corner cube prism 8 cannot be collected by the objective 2, the reflected laser beams 3 here form a narrow, sharply delimited circular section 43, which is also shown schematically by means of a multiplicity of dots. Owing to the rectangular opening of the further objective 41, the bundle of emitted laser beams 1 has a rectangular cross-section, which gives rise to the straight bounding line of the circular section 43. The round bounding line is due to the circular opening of the objective 2.

According to FIG. 11, however, background rays 28 are also collected via the objective 2 and projected in the direction of the receiver 7. Here, said rays strike the total represented part of the receiver 7. In addition to the laser beams 3 reflected by the corner cube prism 8, background rays 28 focused onto the active detector area 42 are thus also detected.

Via the detector area 42 rays from a cross-sectional region of the bundle, which region coincides with the active detector area 42, are specifically selected from the bundle of collected rays by the device according to the invention from FIG. 11. Only this part of the bundle of collected rays is converted by the receiver 7 into electrical signals. In this working example, the cross-sectional region with the selected rays corresponds to the detector area 42.

Here, the cross-sectional region has a first section 5 at one end and a second section 6 at the other end. Selected laser beams 3 reflected by a far-off corner cube prism 8 lie within the first section 5, while selected laser beams 3 reflected by a close corner cube prism 8 lie within the second section 6. Here, the second section 6 has a larger dimension than the first section 5, with the result that more of the few reflected laser beams 3 from FIG. 11 which are collected at the very close corner cube prism 8 can be detected.

Figure 13:
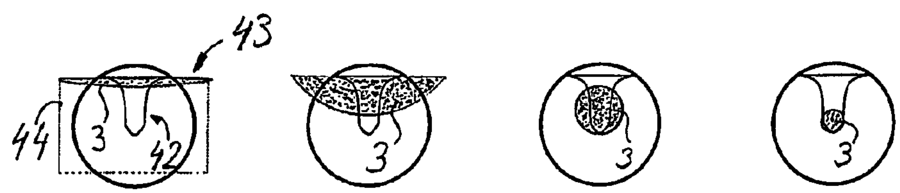
FIG. 13 shows a comparison of four plan views of a detector in the focal plane of the receiving objective of the device from FIG. 11 with in each case different distances to an object which reflects with orientation and FIG. 14 shows the comparison of four plan views of a detector in the focal plane of the receiving objective of the device from FIG. 11 with in each case different distances to an object which reflects with scattering.
Figure 14:
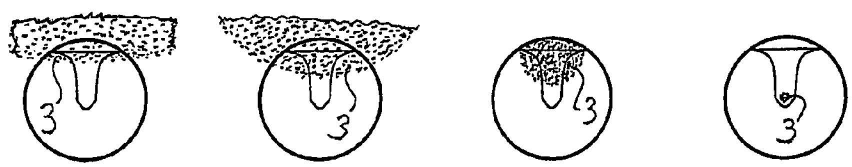

FIGS. 13 and 14 each show a comparison which corresponds in each case to the comparison of FIGS. 5 and 7, respectively. Instead of the plan views of means for selecting rays of the device of monoaxial basic form from FIG. 1, FIGS. 13 and 14 show plan views of means for selecting rays of the device of biaxial basic form from FIG. 11.

The plan views of FIG. 13 show sharply delimited images of laser beams 3 reflected with orientation by the corner cube prism 8 from FIG. 11. The plan views of FIG. 14 on the other hand show diffuse images of laser beams 3 reflected with scattering by a naturally rough surface.

The first plan view of FIG. 13 shows a rectangular frame 44 which corresponds to the rectangular cross-section of the decollimated bundle of emitted laser beams 1 from FIG. 11. Owing to the distance between the objective 2 on the receiving side and the objective 41 on the transmitting side, the collected laser beams 3 reflected with orientation are limited by the edge of the round objective 2 so that, at short distances, only the circular section 43 is projected onto the receiver 7 from FIG. 12.

In the case of a distance d of about one meter—on which the first plan view is based—the circular section 43 here is very narrow. Since, according to the invention the detector area 42 is, however, very extended in this region, sufficient laser beams 3 reflected by the corner cube prism 8 are nevertheless detected in order to permit reliable and rapid measurement.

In the case of a distance d of about 5 meters—on which the second plan view is based—the resulting circular section 43 is substantially broader and migrates in the direction of the axis of the bundle of emitted laser beams 1 from FIG. 11. The consequently increasing quantity of collected, reflected laser beams 3 can be partly compensated by the dimension of the detector area 42 which decreases in the same direction.

In the case of a distance d of about 20 meters—on which the third plan view is based—the image of reflected laser beams 3 already forms an entire circular area.

In the case of a distance d of about one hundred meters—on which the fourth plan view is based—the position of the image of reflected laser beams 3 no longer shifts even in the case of further increasing distance d. All collected, reflected laser beams 3 now strike the part of the detector area 42 with the smallest dimension. In the case of even greater distances, the converted electrical signal then decreases as the square of the increasing distance.

The invention claimed is:

1. A device for measuring the distance to far-off and close objects by which laser beams modulated and emitted by the device are reflected, comprising:

a common objective for emitting the laser beams and for collecting rays which comprise laser beams reflected by the objects and background rays;

means for selecting rays of a cohesive cross-sectional region of a bundle of collected rays, said means having an opening within which a first section and at least one second section are located, wherein laser beams reflected by a far-off object being coordinated with the first section and laser beams reflected by a close object being coordinated with the at least one second section and only a fraction of the collected laser beams reflected by the close object being selected via the second section; and a receiver for converting selected rays into a single electrical signal, by means of which the distance can be determined with the aid of the propagation velocity of optical rays, wherein the means are formed in such a way that the at least one second section has at least the dimension of the first section.

2. The device as claimed in claim 1 for measuring the distance to an object which reflects with orientation, wherein the emitted laser beams are in the form of a decollimated bundle of rays.

3. The device as claimed in claim 1, wherein the means are formed in such a way that the selected cross-sectional region has at least two second sections between which a single first section is arranged, and wherein optionally the selected cross-sectional region is symmetrically formed.

4. The device for measuring the distance to far-off and close objects which reflect with orientation and by which the laser beams which are modulated and emitted by the device and are in the form of a decollimated bundle of rays are reflected, comprising an objective for collecting rays which comprise laser beams reflected by the objects and background rays, a further objective for emitting the laser beams, means for selecting rays of a cohesive cross-sectional region of a bundle of collected rays, said means having an active detector area that houses a first section and a second section, laser beams reflected by a far-off object being coordinated with the first section and laser beams reflected by a close object being coordinated with the second section and only a fraction of the collected laser beams reflected by the close object being selected via the at least one second section, and a receiver for converting selected rays into a single electrical signal by means of which the distance can be determined with the aid of the propagation velocity of optical rays, wherein the means are formed in such a way that the second section has at least the dimension of the first section.

5. The device as claimed in claim 1, wherein the means are formed in such a way that the second section has a larger dimension than the first section.

6. Device as claimed in claim 5, wherein the means are formed in such a way that the selected cross-sectional region tapers starting from the second section toward the first section in such a way that, during measurement to the object which reflects with orientation, at different distances from close to far-off, the respective differences between the intensity of selected rays are reduced.

7. The device as claimed in claim 1 for measuring to an object which reflects with orientation and to an object which reflects with scattering, wherein, for measurement to the object which reflects with scattering, the emitted laser beams are in the form of a collimated bundle of rays.

8. The device as claimed in claim 7, wherein the means are formed in such a way that the selected cross-sectional region tapers starting from the second section toward the first section in such a way that, during measurement to the object which reflects with orientation and to the object which reflects with scattering, in each case at different distances from close to far-off, the respective differences between the intensity of selected rays are reduced.

9. The device as claimed in claim 1, wherein at least one multimode optical fiber is provided for the transmission of selected rays.

10. The device as claimed in claim 9, wherein the means for selection are in the form of an endpiece of a multimode optical fiber which endpiece has been squeezed together in an elongated manner.

11. The device as claimed in claim 1, wherein the means for selection are in the form of a diaphragm.

12. The device as claimed in claim 1, wherein the means for selection are in the form of a reflective, refractive or diffractive optical element.

13. The device as claimed in claim 1, wherein the means for selection are in the form of a detector having an elongated, active detection area.

14. The device as claimed in claim 1, wherein means for selection are arranged in the vicinity of the focal plane of the objective for collecting rays.

15. The device as claimed in claim 1, wherein an eyepiece is provided, the eyepiece and the objective forming a telescope for sighting the objects.

16. The device of claim 11 wherein said diaphragm is in a form of a slit diaphragm or in a form of a crossed-slit diaphragm.

17. The device of claim 11 wherein said diaphragm is in combination with an entry area of a multimode optical fiber.

18. The device of claim 12 wherein said optical element is in a form of a cylindrical lens, free-form lens or a metallized light-collecting funnel.

19. The device of claim 18 wherein said optical element is arranged before an entry area of a multimode optical fiber.

* * * * *